United States Patent Office 2,950,492
Patented Aug. 30, 1960

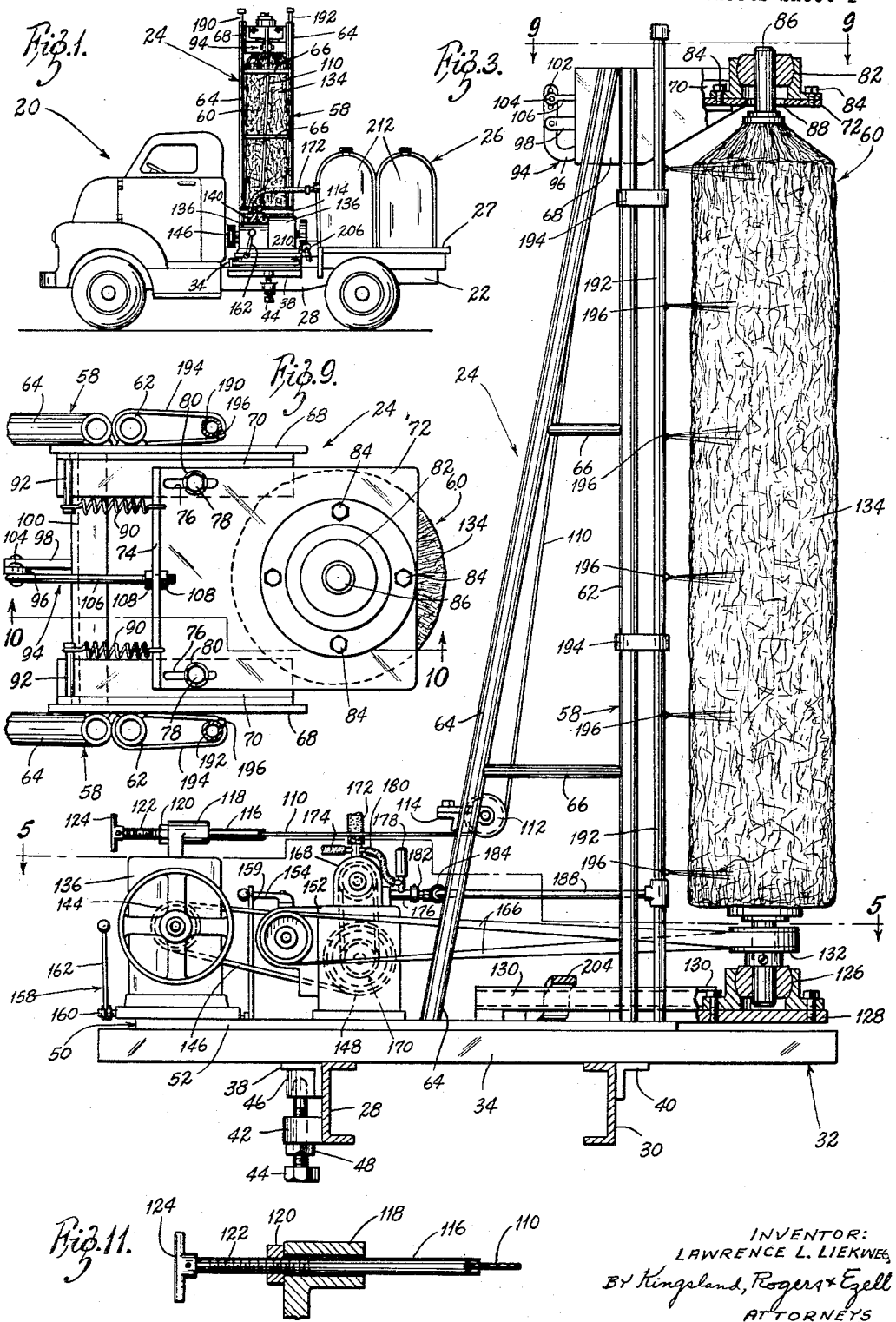

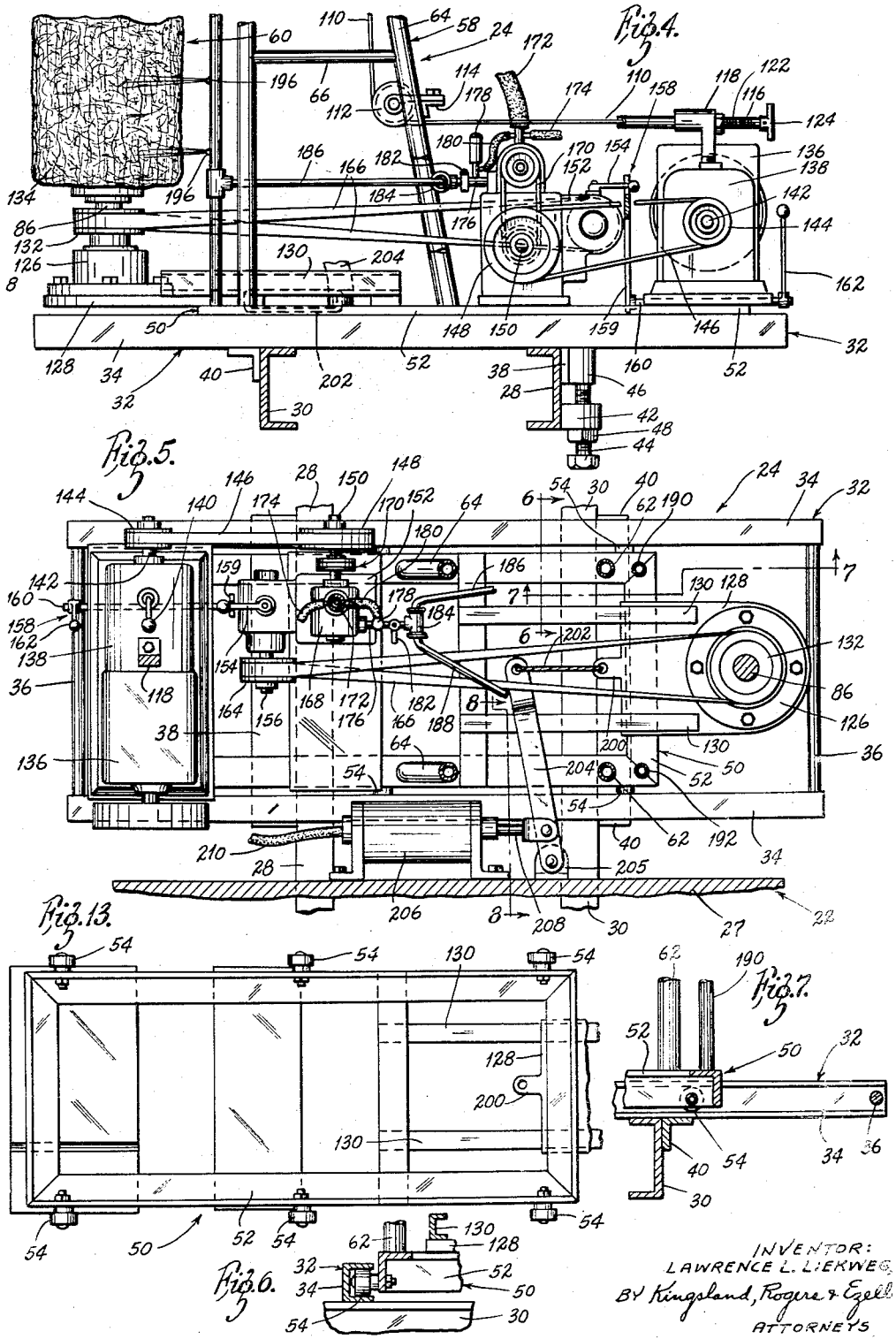

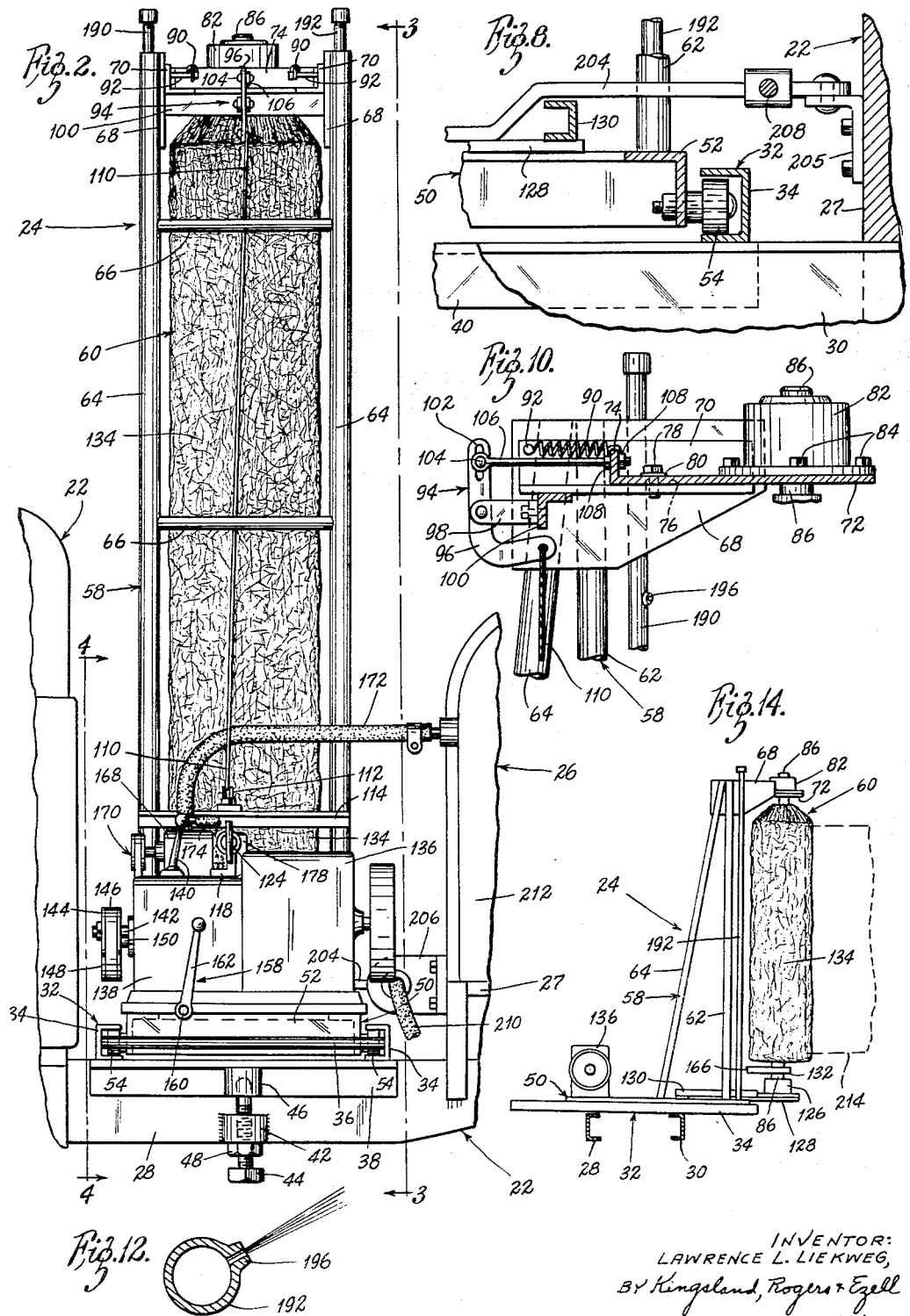

2,950,492

PORTABLE VEHICLE WASHING MACHINE

Lawrence L. Liekweg, 2601 Belt Ave., St. Louis 8, Mo.

Filed Apr. 22, 1955, Ser. No. 503,253

9 Claims. (Cl. 15—21)

The present invention relates generally to scrubbing devices, and more particularly to a mobile trailer washer for cleaning the outside of truck trailers and the like.

Briefly, the invention contemplates a scrubbing assembly which includes an elongated cylindrical brush disposed in a generally upright position and mounted for rotation about its longitudinal axis. The rotatable brush is mounted on a movable brush carriage which also supports a spray system comprising vertically spaced spray nozzles arranged on each side of the rotatable brush and appropriate prime mover means to rotate the brush and to pump water or a liquid cleaning solution through the spray system. This whole scrubbing assembly is preferably mounted on a tractor, which also carries tanks for water and cleaning compound so as to provide a mobile washer which may be moved along and around a trailer, or the like, to be washed. The brush carriage is mounted for transverse movement with respect to the tractor, the arrangement being such as to provide means for adjusting the pressure of the rotating brush against the vehicle being washed. Means are also provided for adjustably tilting the brush from a true vertical position so as to insure engagement of the same over the full vertical extent of the vehicle being washed. A power device is provided for retracting the brush carriage from the extended position it occupies during a washing operation.

It is an object of the present invention to provide a novel trailer washer which may be adapted for stationary, portable, or mobile operation.

It is another object of the invention to provide a novel mobile trailer washer which comprises a scrubbing assembly mounted on a transversely movable carriage supported on a self-propelled vehicle.

It is another object of the invention to provide a novel mobile trailer washer incorporating a rotatable cylindrical brush mounted for adjustable pressure engagement with a truck trailer, or the like, to be scrubbed.

It is another object of the invention to provide a generally upright cylindrical brush which may be adjustably tilted so as to conform with the disposition of the surface to be scrubbed.

It is another object of the invention to provide a novel trailer washer which includes means for mixing and distributing a solution of water and detergent.

The foregoing, along with additional objects and advantages, will be apparent from the following description of a specific embodiment of the present invention as illustrated in the accompanying drawings, and in which:

Figure 1 is a side elevation of the mobile trailer washer comforming to the teachings of the present invention;

Figure 2 is an enlarged fragmentary view generally similar to the central portion of Figure 1, showing a scrubbing assembly;

Figure 3 is a vertical sectional view taken generally along the line 3—3 of Figure 2, certain elements on the section line being omitted in order to provide a clear rear view of the scrubbing assembly;

Figure 4 is a fragmentary vertical sectional view taken generally along the line 4—4 of Figure 2, showing a portion of the scrubbing assembly as viewed from the front, certain elements in the background being omitted in the interest of clarity;

Figure 5 is a fragmentary horizontal sectional view taken generally along the line 5—5 of Figure 3;

Figure 6 is a fragmentary vertical sectional view taken generally along the line 6—6 of Figure 5;

Figure 7 is a fragmentary vertical sectional view taken generally along the line 7—7 of Figure 5;

Figure 8 is an enlarged fragmentary vertical sectional view taken generally along the line 8—8 of Figure 5;

Figure 9 is an enlarged fragmentary horizontal sectional view taken generally along the line 9—9 of Figure 3;

Figure 10 is a fragmentary vertical sectional view taken generally along the line 10—10 of Figure 9, showing the upper end of the scrubbing assembly;

Figure 11 is an enlarged fragmentary sectional view showing a control for adjusting the position of a scrubbing brush;

Figure 12 is an enlarged sectional view of a spray pipe;

Figure 13 is a bottom plan view of a scrubbing assembly carriage; and

Figure 14 is a schematic representation illustrating the manner in which the trailer washer of the present invention is used.

Referring to the drawings more particularly through the use of reference characters, the numeral 20 designates generally a mobile trailer washer constructed in accordance with the teachings of the present invention. Broadly, the trailer washer 20 includes a generally conventional tractor 22 on which is mounted a scrubbing assembly 24 and a tank assembly 26. Preferably, the arrangement is that illustrated in Figures 1 and 2 wherein the scrubbing assembly 24 is disposed immediately behind the tractor cab and the tank assembly 26 is supported on a platform 27 at the rear end of the tractor chassis.

The tractor 22 has a conventional chassis frame including parallel channels 28 and 30 disposed, respectively, on the left and the right side of the longitudinal centerline of the tractor. A rectangular frame 32 rests upon these channels 28 and 30 and, in turn, supports the scrubbing assembly 24 as is apparent from Figures 3 and 4 of the drawings. The frame 32 is preferably fabricated of conventional steel sections, including parallel channels 34 disposed transversely of the channels 28 and 30 as illustrated in the drawings. The spaced-apart channels 34 are disposed with their flanges extending inwardly and are suitably joined by end members 36 and by intermediate members 38 and 40. These latter members, 38 and 40, preferably take the form of angles arranged, as best illustrated in Figures 3 and 4, to embrace the twin channels 28 and 30, thereby to retain the frame 34 in a fixed location relative to the tractor 22. A threaded flange or boss 42 secured to the channel 28 as illustrated in Figures 2 through 4 is provided with an adjusting bolt 44 which extends upwardly therethrough to engage a pressure block 46 secured to the angle member 38 of the frame 34. Clearly, the arrangement is such that the bolt 44 may be adjusted upwardly so as to raise one end of the frame 34, thus to provide a predetermined degree of inclination of the latter downwardly to the right. A jam nut 48 is provided for securing the bolt 44 in adjusted position. The vertical flange of the angle member 40 will spring slightly to permit this adjustment.

A carriage assembly 50 comprises a horizontal rectangular frame 52 constructed of angle members welded together as clearly illustrated in the bottom plan view of Figure 13 in the drawings. The frame 52 is provided with a plurality of roller assemblies 54 arranged in spaced parallel rows so as to be received in the opposed channels 34 of the supporting frame 32. The engagement of the rollers 54 in the channels 34 is clearly illustrated in Figures 6, 7 and 8 wherein it is obvious that the frame 52 is narrower than the frame 34. From Figure 5, it will be observed, further, that the frame 52 is shorter than the frame 34, and it is, therefore, enabled to move on its roller assemblies 54 in a direction transverse to the truck tractor 22. This transverse movement of the frame 52 is limited, of course, to the space between the end members 36 of the frame 34.

The carriage 50, in addition to the horizontal frame 52, includes an upright frame 58 which may take any convenient form adapted to support the upper end of a vertically mounted brush assembly 60, along with elements of a liquid distributing system to be described. In the present illustration, the upright frame 58 comprises twin vertical upright members 62 and inclined members 64 joined by means of tie bars 66 to form a rigid tower-like assembly. The upright frame 58 is secured, as by welding, to the rectangular frame 52 so as to be movable therewith.

Directing attention now to Figures 9 and 10, the upper end of the frame 58 is provided with parallel side plates 68, each having an angle 70 secured on the inside thereof for support of a reciprocable horizontal plate 72 having an upturned flange 74. The plate 72 has parallel slots 76 therein, through which screws 78 project for threaded engagement with the individual angle brackets 70. The bolts 78 may be provided with washers 80.

A generally conventional self-aligning bearing assembly 82 is mounted adjacent the end of the plate 72 remote from the upturned flange 74 and is secured by means of screws 84. The bearing assembly 82 receives the upper end of a vertical shaft 86 which extends through a hole 88 in the plate 72, the hole 88 being of such size as to provide ample clearance around the shaft.

As best illustrated in Figures 9 and 10, the plate 72 upon which the bearing assembly 82 is mounted is biased toward a retracted position with respect to the upright frame 58 by means of a pair of tension springs 90 stretched between the upright flange 74 and individual pins 92 appropriately mounted in the angles 70 and plates 68. Obviously, the plate 72 is limited in its reciprocation by the length of the slots 76 therein. A control assembly 94 for advancing the plate 72, and, hence, the upper end of the vertical shaft 86, comprises a bellcrank 96 pivotally supported on a bracket 98 secured to a cross angle 100 extending between the support angles 70. One end of the bellcrank 96 extends generally upwardly and contains a slot 102 which is slidably engaged by a pivot pin 104 mounted in the end of a rigid connecting link 106. The link 106 extends forwardly for adjustable securement by means of nuts 108 and the upstanding flange 74 of the plate 72. A cable 110 is secured to the other end of the bellcrank 96 and extends downwardly through the frame 58 and around a pulley 112 mounted to a cross member 114 of the frame 58 for connection with a reciprocable drawbar 116 supported in a fixed bracket 118. The bracket 118 includes a threaded nut 120 which may be interlockingly engaged by threads 122 formed on the drawbar 116. The bar 116 has a handle 124 by means of which it may be rotated for selectively changing the position of the plate 72 relative to the frame 58.

The lower end of the shaft 86, like the upper end thereof, is mounted in a self-aligning bearing 126, which is in turn supported on a base plate 128. This base plate 128 extends beyond one end of the rectangular frame 52 as best shown in Figure 5, and is rigidly supported by means of beam members 130 appropriately framed into the structure of the rectangular frame 52 as is clear from Figure 13.

The brush assembly 60 includes, in addition to the vertical shaft 86, a pulley 132 secured to the shaft 86 immediately above the bearing assembly 126, and a plurality of sectional circular brushes mounted in a conventional manner on the shaft 86 so as to form a continuous cylindrical brush 134. The brush sections are appropriately keyed to the shaft 86 so that powered rotation of the pulley 132 effects like rotation of the shaft 86 and the brush 134.

Power for rotating the brush assembly 60 on its vertical axis is provided by a prime mover in the form of a gasoline engine, illustrated schematically in the drawings and designated by the numeral 136. The engine 136 is provided with a conventional throw-out clutch assembly 138 selectively engaged and disengaged by means of a control handle 140. The clutch assembly 138 terminates in a driven shaft 142 provided with a belt pulley 144 connected by means of a belt 146 to a pulley 148 mounted on an input shaft 150 of a variable speed transmission 152. This transmission 152 is of conventional type having a lever 154 for varying the ratio of speed between the input shaft 150 and an output shaft 156. A control extension assembly 158 is provided for operating the lever 154 from a position beyond the left hand end of the frame 32 and hence more convenient to the operator of the washer 20. This extension assembly may taken any convenient form, such as the illustrated lever 159 having a forked upper end for engaging the transmission lever 154 and being mounted on a pivotable extension shaft 160 provided with a handle 162. The output shaft 156 of the transmission 152 is provided with a pulley 164 connected by means of a belt 166 to the pulley 132 mounted, as aforementioned, near the lower end of the shaft 86 of the brush assembly 60.

A pump 168 for handling water and similar liquids is mounted on top of the transmission 152 and is driven by means of a belt and pulley assembly 170 which interconnects the pump shaft with the input shaft 150 of the transmission 152. This arrangement is clearly illustrated in Figures 4 and 5, which also show the piping attachments to the pump 168. A flexible conduit 172 delivers water to the pump 168 from the tank assembly 26. An auxiliary conduit 174 also connected into the pump 168 is provided for delivering a soap solution, or the like, for admixture with the water from the tank assembly 26. The output from the pump 168 is delivered through a pipe 176 provided with a pressure release valve 178 connected by means of a conduit 180 back into the intake of the pump 168. Beyond the valve 178, the conduit 176 is provided with a shutcock 182, and beyond this with a T-fitting 184 leading to branch conduits 186 and 188.

The conduits 186 and 188 connect into vertical spray pipes 190 and 192, respectively, the latter being disposed vertically adjacent the upright members 62 of the frame 58. Straps or clamps 194 secure the spray pipes 190 and 192, one on either side of the brush assembly 60, as illustrated in the drawings. Each of the spray pipes 190 and 192 is provided with spaced nozzle outlets 196 by means of which water, or a mixture of water and cleaning solution, may be discharged past the brush assembly 60. Figure 12 illustrates one form of nozzle outlet that may be employed.

As previously mentioned, the movable carriage 50 has connected to the rectangular frame 52 thereof the plate 128 and the beam members 130 which support the brush assembly 60. The illustrated plate 128 is provided with a tab 200 to which is secured one end of a link 202, the other end of this link being connected to a lever 204 having its opposite end pivotally mounted to a bracket 205 attached to the platform which, as previously indicated, is mounted on the tractor chassis for support of the tank assembly 26. This arrangement is clearly shown in Figure 5, which also depicts a cylinder assembly 206 mounted to the platform 27 and having a piston rod 208 connected intermediate the ends of the lever 204. Clearly, retraction of the piston rod 208 is effective to withdraw the carriage 50 to the position illustrated in Figure 5, wherein it will be noted that the entire scrubbing assembly 24 is retained within the lateral limits defined by the fixed frame 32. The cylinder assembly 206 is provided with a fluid conduit 210 which will be understood to be connected into the vacuum system of the tractor power plant. Thus, as is well understood, application of vacuum through the conduit 210 to the cylinder assembly 206 is effective to retract the piston 208 to obtain withdrawal of the scrubbing assembly 24.

The tank assembly 26 comprises one or more tanks 212 appropriately interconnected to provide water or other liquid through the conduit 172 to the pump 168.

*Operation*

The present trailer washer 20 is prepared for operation by filling its tanks 212 with water and by providing an appropriate soap or detergent solution for admission through the conduit 174.

As a rule, the frame 32 which supports the scrubbing assembly carriage 50 will be disposed at a slight inclination to the horizontal. It will be understood that this inclination is downwardly to the right or to the brush side of the trailer washer 20, it being effected through the adjustable bolt 44 which, as above described, is adapted to raise the left end of the frame 32. Obviously, with the frame 32 thus tilted, the carriage 50 and the operative elements mounted thereon will tend to move to the right of the trailer washer 20 so that the brush assembly 60 will be disposed well beyond the side of the tractor 22 and the tank assembly 26. This condition is shown schematically in Figure 14, from which it will be clear that the brush 134 is free to engage the side of a trailer 214 indicated fragmentarily in dotted outline.

Since, understandably, it is preferable that the scrubbing assembly be retracted to a position within the lateral limits of the frame 32 whenever the trailer washer 20 is to be moved over the road, or from one washing job to another, the cylinder 206 may be selectively actuated by opening the connection between the conduit 210 and the vacuum system of the tractor so as to effect withdrawal of the carriage 50 through the retracting action of the piston 208 connected through the lever 204 and the link 202 to the plate 128 of the carriage 50.

In order to wash a trailer or the like, the trailer washer 20 is driven alongside the same and the aforementioned connection of the cylinder 206 to the engine vacuum system is shut off so as to enable the carriage 50 to roll down the inclined frame 32 until the brush 134 engages the side of the trailer. If necessary, the brush 134 is tilted through manipulation of the draw bar 116 so as to be parallel with the side wall of the trailer to be washed. The engine 136 is then started and the clutch 160 engaged so as to drive, not only the brush assembly 60, but also the pump 168. By opening the shutcock 182, the pump is enabled to deliver water received from the tanks 212 through the aforementioned piping system for discharge from the nozzle outlets 196. The water thus delivered is driven against the side of the trailer being washed so as substantially to flood the same on each side of the rotating brush 134. The operator drives the tractor alongside the trailer being washed so as to move the scrubbing assembly completely therearound and thus effect a complete washing of the same.

If desired, a soap or detergent solution may be introduced through the conduit 174 for admixture with the water from the tanks 212, this mixture being then delivered through the nozzle outlets 196. The pressure relief valve 178 serves to maintain a constant delivery pressure which may be adjusted as is conventional in such arrangements. It will be noted also, that this valve 178 along with the return conduit 180 accommodates the situation wherein the shutcock 182 may be closed while the pump continues to be driven.

The speed of rotation of the brush assembly 60 may be controlled through manipulation of the lever 154 by means of the extension assembly 158 terminating in the handle 162. The location of this handle 162 and also of the handle 140 which controls the clutch assembly 138 makes them easily accessible to the operator sitting in the driver's position at the left hand side of the cab of the tractor 22. The control (not shown) for actuating the retracting cylinder 206 is, of course, also located within the cab so that, upon completing his traverse around the trailer being washed, the operator may immediately retract the carriage 50 and proceed to the next trailer to be washed.

Inasmuch as the washing efficiency of the instant trailer washer 20 depends in substantial degree upon the maintenance of proper pressure engagement between the rotating brush 134 and the trailer being washed, it will be understood that such pressure is adjustable by the act of changing the inclination of the frame 32 upon which the scrubbing assembly 24 is adapted to roll. Increased inclination of the frame 32 will obviously provide greater pressure between the brush 134 and the trailer to be washed. The gravitational bias of the carriage, of course, causes the brush to remain in engagement with the surface being washed, even though the tractor should not be driven in a straight line. The arrangement also provides for efficient washing of surfaces which have projections, such as outside posts, or other reinforcements.

Clearly, there has been provided a mobile trailer washer which fulfills the objects and advantages sought therefor.

It will be understood that the foregoing description and the accompanying drawings have been given only by way of illustration and example. It will be further understood that changes in the form of the elements, rearrangement of parts, or the substitution of equivalent elements, all of which will be obvious to those skilled in the art, are considered to be within the scope of the present invention, which is limited only by the claims which follow.

What is claimed is:

1. In a trailer washer, a movable vehicle, a scrubbing assembly including a rotatable brush, and means including movable supporting means mounting said brush on said vehicle for movement transversely of said vehicle and for yieldable constant pressure engagement with a substantially vertical surface to be washed during non-parallel translatory relative movement of said movable vehicle along the surface to be washed.

2. The combination of claim 1 wherein the movable supporting means comprises a carriage provided with rollers and wherein the mounting means further includes track means for said rollers whereby the carriage may move transversely of said vehicle, and means for adjustably sloping the track means so as to provide a selected degree of gravity bias tending to advance the carriage.

3. The combination of claim 2 wherein the brush is cylindrical, said cylindrical brush being disposed with one end higher than the other, said mounting means including means mounting said brush for tilting adjustment relative to the surface to be washed.

4. A mobile trailer washer comprising, in combination, a movable vehicle, a supporting frame including track means mounted on said vehicle, said track means extending generally transversely to the normal direction of movement of said vehicle, and means including a scrubbing assembly mounted for movement along said track means toward a surface to be scrubbed, said track means being disposed with a downward inclination toward the surface to be scrubbed so that the scrubbing assembly may gravitate into engagement with said surface and may engage the same at substantially constant pressure despite movement of said vehicle in a direction other than exactly parallel to said surface.

5. The combination of claim 4 wherein the scrubbing assembly includes an elongated cylindrical brush disposed in generally upright position at one end of the movable carriage, said brush being rotatably supported in self-aligning bearings, at least one of said bearings being mounted for limited horizontal movement parallel to the track means, and means for effecting movement of said one bearing so as selectively to adjust the position of the brush relative to a surface to be scrubbed.

6. The combination of claim 4 wherein the scrubbing assembly includes spray means comprising a liquid pump, distributing conduits connected to said pump and having nozzle outlets directed in a common direction, automatic means for limiting the pressure of liquid in the distributing conduits, said automatic means including means for recirculating pumped liquid back through the pump, and a shutoff valve between said automatic means and said distributing conduits.

7. The combination of claim 6 plus means for introducing liquids from more than a single source for admixture in the pump and delivery through the nozzle outlets.

8. A trailer washer comprising, in combination, an automotive vehicle having an operative station on one side thereof, a tank assembly mounted in fixed position on said vehicle, and a supporting carriage mounted for automatic lateral movement on said vehicle and supporting a scrubbing assembly, said scrubbing assembly including an upstanding cylindrical brush rotatably disposed adjacent the side of said automotive vehicle opposite that of the operative station, a liquid pumping and distributing system for delivering liquid laterally of said vehicle and past said brush, means connected to the upper end of said brush for moving it relative to the lower end, and power means for simultaneously rotating said brush and operating said pumping and distributing system, said power means having controls located adjacent the same side of said vehicle as the operative station.

9. The combination of claim 8 wherein the power means includes speed control means, and wherein the pumping and distributing means includes automatically operable pressure regulating means.

References Cited in the file of this patent

UNITED STATES PATENTS

| | | |
|---|---|---|
| 1,411,321 | Wright | Apr. 4, 1922 |
| 1,823,222 | Whitsitt | Sept. 15, 1931 |
| 1,827,887 | Gillespie | Oct. 20, 1931 |
| 1,988,665 | Ross | Jan. 3, 1935 |
| 2,253,609 | Byron et al. | Aug. 26, 1941 |
| 2,327,879 | Farrar | Aug. 24, 1943 |
| 2,559,295 | Grossenbacher | July 3, 1951 |
| 2,579,866 | Rousseau | Dec. 25, 1951 |
| 2,636,198 | Wilson | Apr. 28, 1953 |
| 2,646,586 | Foutes | July 28, 1953 |
| 2,692,214 | Hurst | Oct. 19, 1954 |
| 2,876,472 | Rousseau | Mar. 10, 1954 |

FOREIGN PATENTS

| | | |
|---|---|---|
| 692,005 | Great Britain | May 27, 1953 |